Patented June 18, 1946

2,402,370

UNITED STATES PATENT OFFICE 2,402,370

METHOD OF PRODUCING MAGNES[IUM] COMPOUNDS

Henry B. Chalmers, New York, N. Y.

No Drawing. Application June 20, 1942, Serial No. 447,749

3 Claims. (Cl. 23—128)

The present invention provides an improved process for converting natural magnesium silicates into more readily useful compounds particularly an intermediary a mechanical mixture of silica ($SiO_2$) with sulphates of magnesium, with sulphates of iron and/or other impurities present in rock used. Said intermediary is in itself a valuable addition product to many fertilizers. Those skilled in the art find that the addition of water readily dissolves the sulphates and the silica quickly settles so that a clear solution of the sulphates can be drawn off and used for the manufacture of Epsom salts the recovery of any valuable impurities frequently chrome or nickel or as a source of magnesium chloride and/or the metal.

Although magnesium is one of the most common metals in natural rocks, the deposits of soluble compounds and compounds which are readily converted to useful compounds or to metallic magnesium are relatively limited. On the other hand, the deposits of magnesium compounds found in serpentine rock, olivine, and dunite are relatively unlimited and are obtainable in convenient locations throughout both eastern and western United States. Millions of tons of serpentine rock in ground form, for example, is obtained as a waste product at asbestos mines and must be disposed of, at substantial expense.

Serpentines, olivine, dunite and the like contain about 40 to 50% of magnesia which corresponds to about 24 to 30% of metallic magnesium. In serpentine about one-third of this is readily converted by sulphuric acid into a sulphate.

It is stated in the Washington State Bulletin P—1940 that serpentine is not considered a magnesium ore on account of the cost of separating magnesium from chemical combinations with silica.

The present invention has for an object to provide an improved method which can be effectively and economically operated to break the bond between the magnesia and the silica in naturally occurring magnesium silicates.

The nature and objects of the invention will be better understood from a description of a particular embodiment thereof.

In any suitable container sulphuric acid is maintained by float or other means to a level at which is secured a needle perforated sheet of lead. On this sheet of lead serpentine, olivine ground to pass a 40 mesh or finer screen is laid down to a suitable depth, depending on its fineness of grind. In a few hours the sulphuric acid permeates the mass because of capillary attraction and the color of the powder darkens and the volume increases and continues to increase for several days as the acid is drawn up as used by its reaction with olivine and the consequent absorption of the water available, either as formed in the reaction or from the dilution of the acid used by the newly formed magnesium sulphate. When the volume ceases to increase there is a cake about four times the height and volume of the ground rock placed on the separating sheet. This cake is light, friable and porous and consists of a mixture of silica with the sulphates of magnesium and of impurities in the rock used.

This cake is easily broken up and may be used as a component in certain fertilizers as is, or as an intermediary for the manufacture of Epsom salts, magnesium chloride or the metal itself.

If the broken up cake is not separated into its parts by a dry method it may be stirred into water which in a few minutes brings the sulphates into a clear solution from which the silica settles and the clear liquid can be drawn off and used for any of the purposes above mentioned by any one familiar with the products desired.

The silica when washed and dried is in a finely divided state so that about 50% will pass through a 324 sieve, and as a by-product has value. No silica gel is formed in process.

It is desirable to dilute the acid used to about 43 Bé. and chamber acid may be used, and in some cases so-called spent acid from other uses can be brought at a suitable concentration and used. In place of perforated lead any screen of acid resisting nature which meets the requirements may be substituted.

The foregoing particular description is illustrative merely and is not intended to define the limits of the invention. Variations and modifications and adaptations may be made without departing from the scope of the invention as defined in the claims. For example nitre cake can be used as a substitute for sulphuric acid.

This application is in part a continuation of applicant's co-pending application, Ser. No. 323,494, filed March 11, 1940.

I claim:

1. The method of converting magnesium silicate to magnesium sulphate which comprises supporting a mass of granular magnesium silicate above but in contact with a body of sulphuric acid in position to take up the sulphuric acid by capillary action whereby the acid will be fed slowly into the mass of silicate at a rate corresponding to the rate of consumption of the acid.

2. The method of converting magnesium silicate to magnesium sulphate which comprises supporting a mass of granular magnesium silicate above but in contact with a body of sulphuric acid in position to take up the sulphuric acid by capillary action, maintaining the level of the sulphuric acid substantially constant whereby the acid will be fed slowly into the mass of silicate at a rate corresponding to the rate of consumption of the acid.

3. The method of converting magnesium silicate to magnesium sulphate which comprises supporting a mass of granular magnesium silicate upon a horizontal perforated support and maintaining a supply of sulphuric acid in contact with the silicate and only slightly above the level of the horizontal support.

HENRY B. CHALMERS.